Patented Apr. 11, 1950

2,503,246

UNITED STATES PATENT OFFICE 2,503,246

ASPHALT EMULSION

Willis G. Craig, Cleveland, Ohio, assignor to The Lubrizol Corporation, Wickliffe, Ohio, a corporation of Ohio No Drawing. Application September 28, 1948, Serial No. 51,649

27 Claims. (Cl. 252—311.5)

The present invention relates to asphaltic emulsions of general application. More particularly, this invention relates to asphaltic emulsions containing a minor amount of an asphalt improving agent for use particularly as a coating and lubricating agent for fibrous material, a bonding agent of general utility, in the preparation of asphalt roofing paper, as an undercoating for asphalt shingles, in paving compositions, etc.

Asphaltic materials have a number of uses in the form of a viscous hot asphalt coating. The viscous hot asphalt, however, suffers from a number of serious deficiencies which materially reduce its applicability. The labor cost in the use of hot asphalt is prohibitive, and expansive special heating and fluidizing equipment are required in order to handle the material. Furthermore, products formed with hot asphalt possess a number of detrimental characteristics such as "blistering" due to poor bonding characteristics, poor wearing, and poor weathering properties.

Some effort has been made to use asphalt in the form of an aqueous emulsion thus decreasing the cost of its use and increasing the range of its utility and application. Such emulsions, however, also suffered from a number of drawbacks such as, inability to wet the material to which they were applied, prolonged setting period, lack of proper fluidity, lack of penetrability when used on a fibrous material, poor weathering properties, lack of adhesive properties toward metal, tendency to invert to a water-in-asphalt form, etc.

In an effort to overcome these deficiencies, a wide variety of chemical compounds such as wetting agents, detergents, and the like have been incorporated in small quantities in the asphalt emulsions. These addition agents while improving some of the properties of the asphalt emulsion raised additional problems such that up to the present time there has not been produced an asphalt emulsion which has general over-all application. For example, metal salts of petroleum sulphonic acids have been employed as an asphalt additive; but these compounds cause the emulsion to gelatinize upon standing and render the emulsion more viscous, thereby limiting its use. Furthermore, such compounds are almost impossible to incorporate in the emulsion by ordinary means. Likewise, other detergents, emulsifiers, and wetting agents such as, alkylated aryl polyether emulsions, sodium salts of alkyl-aryl polyether sulphates, phthalic glycerol alkyd resins, sodium hexametaphosphate, certain alkylated aromatic compounds, etc. have been employed without obtaining substantially improved results.

It is an object of this invention to provide an asphalt emulsion containing a water-soluble asphalt addition agent.

A further object of this invention is to provide an asphalt emulsion which remains in a homogeneous fluid state over a long period of time and does not invert to a water-in-asphalt form.

A still further object of this invention is to provide an asphalt emulsion for a superior wetting and adhesive or bonding characteristics.

Another object of this invention is to provide an asphalt emulsion having superior penetrating and coating properties toward woven fibrous materials.

Another object of this invention is to provide an asphalt emulsion which more rapidly and thoroughly sets and which has superior weathering and anti-oxidation properties.

Another object of this invention is to provide an asphalt emulsion that is feasible of commercial production and which has a universal applicability not previously obtainable.

Further and additional objects will appear as the description proceeds.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, my invention comprises an asphaltic composition comprising a major amount of an asphalt emulsion and a minor amount of a compound having the formula:

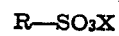

wherein R is an organic radicle containing an aliphatic substituted diphenyl ether group, and X is one equivalent of a hydrophilic salt-forming radicle. Of the aliphatic substituted diphenyl ether groups I prefer to use the alkyl substituted diphenyl ether groups such as may be produced by a process of alkylation.

Included within the scope of the foregoing formula for materials which have been found suitable for use as asphalt additives in the present invention are those having the following structure:

wherein R and R' are divalent organic radicles each containing an aliphatic substituted diphenyl ether group, X is one equivalent of a hydrophilic salt-forming radicle, and $n$ is a small whole number from 1 to 6.

By the term "hydrophilic salt-forming radicle" as used herein and in the appended claims I mean to define those radicles and elements the presence of which in the molecule will tend to orient the molecule toward water in the water-hydrocarbon interface.

Illustrative specific examples of such radicles are the alkali metals such as sodium, potassium, and lithium; ammonium and aliphatic substituted ammonium radicles such as, dimethyl-ammonium, iso-propyl-ammonium, etc.

Of the aliphatic substituted diphenyl ether groups which may be employed as "R" in the above formulas, I prefer to use those in which the diphenyl ether nucleus has been interacted with 1 or more aliphatic groups in which the total number of carbon atoms is preferably at least about 20, and desirably at least about 30. It should be noted that in the preferred aliphatic substituted diphenyl ether nucleus, the 20 or more carbon atoms may be imparted by 1 or a plurality of aliphatic substituent groups for example, 3 capryl radicles may be employed to impart, as in a preferred case, the 20 or more carbon atoms to the diphenyl ether nucleus. Particularly useful alkylating materials are derived from hydrocarbon wax of petroleum origin. Waxes of petroleum origin are not only particularly suited for use in the additives of my invention, but also possess the desirable features of ready availability and low cost.

I. DESCRIPTION OF THE ASPHALT ADDITION AGENTS

The principle and preferred materials included within the foregoing formulas which I have found especially desirable for use as asphalt additives are the following:

A. The hydrophilic salts of alkylated diphenyl ether sulphonic acids:

B. The hydrophilic salts of alkylated diphenyl ether sulphonic acid sulphides and polysulphides.

The hydrophilic salts of alkylated diphenyl ether sulphonic acids may be secured by first alkylating the diphenyl ether with a suitable alkylating material such as "wax unsaturate," or monochlor wax, or the like to produce a diphenyl ether having at least 1 aliphatic group attached to a ring carbon atom thereof. (A method of producing "wax unsaturate" and monochlor wax is described in Patent No. 2,218,132.) The aliphatic substituted diphenyl is thereafter sulphonated with a strong sulphonating reagent such as chlor sulphonic acid to produce the corresponding aliphatic substituted diphenyl ether sulphonic acid. This material is then neutralized with a basic compound such as an alkali metal oxide, hydroxide, carbonate, or an amine to produce the hydrophilic salts.

The initial aliphatic substitution reaction may be effected by promoting an interaction between the aliphatic material and the diphenyl ether. Preferred materials for this purpose are petroleum wax derivatives such as the previously mentioned "wax unsaturate" or monochlor wax containing from 12 to 22% chlorine. Other desirable sources of aliphatic substituents which may be employed are derivatives of ceresin, slack wax, slop wax, rod wax, and other wax hydrocarbons of petroleum origin. Further specific examples of substituent providing compounds which may be used to produce the addition agents of my invention include n-octyl, 2-ethyl-hexyl, and capryl alcohols, n-decyl alcohol, lauryl alcohol, myristyl alcohol, stearyl alcohol and the like. Olefins having about the same number of carbon atoms as the aforementioned alcohols may also be used as substituent providing agents for example, octenes, e. g., octene-1, octene-2, commercial mixtures of octene-1 and octene-2, decylenes, do-decylenes, hexa-decylenes, octa-decylenes, etc. It should be noted that when employing such alcohols or olefins as the substituent providing materials, to produce preferred materials the mole ratio of alcohol or olefin to diphenyl ether should be such as to provide a molecule which contains at least 20 substituted carbon atoms. The substitution or interaction is usually performed by admixing the substituent providing material and the diphenyl ether and heating to a temperature of from about 150° C. to about 250° C. for a relatively short period of time. A substituent providing material may be added to a mixture of diphenyl ether with a reaction promoting catalyst. The process of producing aliphatic substituted diphenyl ether is ordinarily performed in the presence of a catalyst such as an acid activated clay (i. e. "Superfiltrol"), aluminum chloride, zinc chloride, iron chloride, fuller's earth, etc., or combinations of them.

Using monochlor paraffin wax produced as in accordance with the teaching of Patent No. 2,218,132 as an illustrative example. A general procedure for producing wax substituted diphenyl ether would be as follows: The diphenyl ether and aluminum chloride, for example are mixed in a reaction vessel and the temperature elevated to about 150° C. The monochlor paraffin wax is then introduced slowly until the addition is complete, and then the reaction vessel maintained at 150–175° C. for an additional period to insure substantial completion of the reaction. Thereafter, the mixture is treated with a weak solution of hydrochloric acid in water to hydrolyze the aluminum complex formed in the course of the reaction. The product is filtered and distilled to obtain the wax-substituted diphenyl ether product. When employing an unsaturate material such as "wax unsaturate," the diphenyl ether and an acid activated clay catalyst such as "Superfiltrol" are admixed in a reaction vessel and the unsaturate material introduced slowly at a temperature of about 150° C. The reaction is allowed to proceed for a period of about 1 to 3 hours after completion of the addition and the unsaturate, and thereafter filtered and topped to remove unreacted components. The "topped" product may then be employed to produce the additives particularly described later.

A further method of employing a monochlor wax containing 12 to 22% chlorine and involving the combined use of an acid activated clay and zinc chloride would be carried out in general in the following manner: The diphenyl ether, acid activated clay, and zinc chloride would be admixed in a suitable vessel provided with means for agitation and temperature control. Thereafter the monochlor wax would be introduced at a temperature of about 150° C. and upon completion of the addition the mixture agitated for a period up to as long as 6 hours or more. Thereafter the product would be filtered and topped to remove unreacted materials.

When employing petroleum wax as the source of the substituent providing material, it is desirable that the resulting compound contain, on the average, about 2.5 wax groups per diphenyl ether molecule. The calculations as to the number of wax groups present per diphenyl ether radicle may be determined conveniently from the amount of chlorine liberated from the reaction. This is not to be construed as limiting the present invention to such a precise number of wax substituents since compounds having more than, as well as less than, 2.5 wax groups per diphenyl ether molecule have been found to be of utility as additives for asphalt emulsions. The number of wax groups that may be present on the diphenyl ether nucleus may be as many as there are replaceable hydrogens on the diphenyl ether molecule.

After the aliphatic substituted diphenyl ether has been produced, for example by any of the procedures mentioned above, it is then treated with a slight molar excess of a strong sulphonating agent, the most convenient of these being chlor sulphonic acid. The proportion of sulphonating agent is preferably such as to produce an average of about 1 sulphonic acid group per molecule of aliphatic substituted diphenyl ether. The sulphonation is accomplished by adding the sulphonating agent slowly to the aliphatic substituted diphenyl ether while vigorously stirring and cooling the mixture to maintain the reaction temperature to about 30 to 50° C.

To form the hydrophilic salts of the foregoing intermediate aliphatic substituted diphenyl ether sulphonic acids, the alkali metal oxides, hydroxides, carbonates, etc., or amine compounds may be conveniently employed to neutralize the acid. The process employed in this reaction may be any conventional neutralization procedure. Specific hydrophilic salt-forming compounds suitable for use in this reaction include sodium oxide, sodium hydroxide, sodium carbonate, potassium hydroxide, lithium hydroxide, etc.; ammonia, amines such as hydroxyl amines, triethanolamine, di-ethanolamine, cyclohexyl, and ethyl amines, etc. The preferred neutralizing reagents are the sodium compounds since the sodium salts have been found to possess particularly beneficial properties when employed as an asphalt additive.

The compounds coming within the scope of B above have been defined as having the structure

$$XO_3S—R—S_n—R'—SO_3X$$

wherein R and R' are divalent radicles each containing an aliphatic substituted diphenyl ether radicle, X is a hydrophilic salt-forming radicle and $n$ is a small whole number not more than 6. It will be observed that these materials are sulphur containing derivatives of the aliphatic substituted diphenyl ether sulphonic acids previously described.

The above formula is also intended to include within its scope those polymeric compounds represented by the following structure, the symbols having the same definition as previously given:

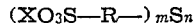
$$(XO_3S—R—)_mS_n$$

where $m$ is at least 3. An example of such material is one having the following structural formula:

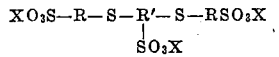
$$XO_3S—R—S—R'—S—RSO_3X$$
$$|$$
$$SO_3X$$

This is probably the type of compound which is produced in many instances as indicated by the fact that the resulting materials have been found oftentimes to possess a rather high viscosity.

The sulphur containing derivatives of the present invention may be secured either by reacting the aliphatic substituted diphenyl ether sulphonic acids with a sulphur halide and then forming the hydrophilic salts, or reacting the aliphatic substituted diphenyl ether with a sulphur halide and then sulphonating for example with chlor sulphonic acid, and neutralizing to form the desired salt. Examples of such sulphur halides are $S_2Cl_2$ and $SCl_2$. When using such reagents the reaction time is relatively short and the temperature usually relatively low, i. e., between 40 and 60° C. The sulphide groups introduced by this reaction may be either mono sulphide or poly sulphide, depending upon the reagent used, and the number of such groups per molecule will depend upon the mole ratio of the reactants employed. Of these materials the poly sulphides and particularly the disulphides are preferred since these compounds give exceptionally good results when employed as asphalt additives. To prepare compounds containing the mono sulphide group, $SCl_2$ should be used. If only one such group is desired in the molecule the mole ratio of the compound being treated to $SCl_2$ should be 2:1. If a plurality of such groups is desired a higher proportion of $SCl_2$ should be used. To prepare compounds which contain the disulphide group $S_2Cl_2$ should be used, in the same proportions as indicated above for $SCl_2$. In preparing compounds which contain poly sulphide groups wherein the number of sulphur atoms is more than 2, a convenient method is to treat the sulphonic acid disulphide prepared as above with elemental sulphur in the desired amount. It should be particularly noted that while treatment with the sulphur chloride reagent may precede sulphonation it is preferable to sulphonate first and then treat the resulting sulphonic acid with the sulphur chloride reagent. It is always best to neutralize the sulphide or poly sulphide of the sulphonic acid as the last step in the preparation of the desired salt.

The following examples are illustrative of the mode in which the asphalt addition agents of my invention may be prepared and are included for illustrative purposes only and are not to be construed as limiting my invention to the precise materials described.

*Example 1*

1020 grams of diphenyl ether, 530 grams of chlorinated paraffin wax containing 19.8% chlorine, and 18 grams of aluminum chloride were placed in a reaction flask equipped with a stirrer, thermometer, and gas exit tube. The mixture was stirred for 3 hours at room temperature. After 15–20 minutes HCl gas was evolved rapidly, and 8 grams of aluminum chloride added to the mixture. The reaction was heated at 50° C. for 2 hours. The reaction mass was poured into 1000 cc. of a 15% HCl solution and heated to 50° C. Thereafter the product was extracted with benzene, washed with water, washed twice with 5% HaHCO3, and twice again with water. The solution was dried by refluxing with a water trap, and the solvent, excess diphenyl ether, and unreacted wax stripped off. The final still temperature was 270° C. at 1 mm. Hg. 705 grams of wax substituted diphenyl ether were recovered as the product, and 479 grams of diphenyl ether and 15 grams of unreacted wax were distilled off.

217 grams of the wax substituted diphenyl ether were treated with 76 grams of chlorosulphonic acid at a temperature of from 35–40°

C. It was necessary to add 100 grams of chloroform to the mixture to permit stirring. The acid number at this point was 100. This product was then neutralized with the calculated amount of aqueous sodium hydroxide and stirred for .5 hour at 80° C. under 100 mm. Hg pressure to remove the chloroform. The product had a sulphate ash of 11.2%.

Example 2

425 grams (2.5 m.) of diphenyl ether and 160 grams of "Superfiltrol," an acid treated clay catalyst, were combined in a reaction flask and heated to a temperature of 215° C. 1150 grams (5 m.) of wax unsaturate were added to the hot solution over a period of 30 minutes, the temperature of the mixture being maintained during the addition period at about 220° C. to 230° C. After the addition had been completed, the temperature was maintained within the above range for an additional 3 hours. The product thus produced was filtered while hot. The filtrate was then stripped to 225° C. at 1 mm. Hg absolute pressure. The product thus produced was believed to contain an average of 2 to 2.5 wax groups per diphenyl ether group.

122 grams of chlorosulphonic acid were added in dropwise fashion to 530 grams of the above wax substituted diphenyl ether. 68 grams of $S_2Cl_2$ were added at 55–65° C. and the mixture stirred for 1 hour. The product at this point had an acid number of 94.5. 43.3 grams of NaOH were added to 30 cc. of water, and this solution added to the acidic organic material. Upon each addition, the material became very viscous and 2 liters of a 5% butyl alcohol solution in lactol spirits were added. The mixture was stirred for 2 hours at 80–90° C., and water was removed by means of a water trap under reflux conditions. The product was then filtered and the solvent removed at 165° C. at 2 mm. Hg. The residue was a dark brown lumpy solid having no odor which upon analysis was found to contain 7.6% sulphur, had an acid number of 6.53, and had a calcium sulphate ash of 10.3%.

A. Concentration of the Asphalt Addition Agent

The effective range of concentration of the additives to be employed has been found to be from about 0.05 to about 2% by weight and preferably from about 0.1% to about 1% based on the weight of asphalt emulsion. Since the addition agents of the present invention are usually used in asphalt or asphalt emulsions in such relatively low concentrations, and since they are generally soluble up to about 50% in water, a convenient method of incorporating them is to prepare a solution in water, say about 15%, and use such solution as the addition material. When a water solution of the additive is thus employed an amount of solution will be used to impart the desired percentage of the additive compound to the final composition.

B. The Improved Asphalt Emulsion

It is to be understood that the term "asphalt" as used herein and in the appended claims is intended to include natural asphalt, blown petroleum asphalt, bitumen, etc.

To produce a conventional asphalt emulsion in which the asphalt addition agent of the present invention is to be incorporated, the usual procedure is to combine the asphalt, water, and an emulsifying agent, such as bentonite, and mechanically agitate the mixture until a suitable asphalt emulsion is secured. In the preparation of the asphalt emulsion, the amount of water present in the emulsion will vary from between about 30% by weight up to about 90% by weight. The amount of water present is usually dependent upon the ultimate use for which the asphalt emulsion is intended, although in general, the water is usually present in a commercial emulsion in an amount of about 50% by weight. A commercial product readily available on the market and prepared in the foregoing manner is the asphalt emulsion marketed under the trade name "Flintkote." This emulsion contains about 50% by weight of water and about 4% by weight of bentonite, with the balance made up of blown petroleum asphalt.

To incorporate my improved addition agent in the asphalt emulsion, the preferred manner is to first prepare a 15% water solution of the asphalt addition agent. An amount of the solution selected from the range of 0.5% to 10% is then incorporated in the asphalt emulsion by ordinary agitation. The improved asphalt emulsion is then ready for use. The addition agent may be incorporated in the asphalt emulsion without first forming a water solution since its solubility in the emulsion is about the same as in the water. When this method is chosen an amount of from between .07% to 2% by weight of the addition agent may be incorporated in the asphalt emulsion by ordinary agitation.

These new and improved asphalt emulsions possess a combination of many desired properties heretofore unobtainable, for example the improved asphalt emulsions of my invention possess a higher fluidity rating, do not invert, have high penetrating qualities and possess extremely good wetting, quick setting, and adhesive qualities, etc.

I am unable at this time to provide a scientific explanation as to why the addition agents of the present invention impart these many and desirable properties to the emulsion. One possible theory is that the additives not only possess the proper polarity so as to be readily soluble in water but also possess a balance between molecule size due to the aliphatic substituents, and water or asphalt solubility such that the asphalt emulsion remains stable and is not inverted to a water-in-asphalt form.

Illustrative Examples of the Improved Asphalt Emulsions

It becomes convenient to list a few illustrative and representative examples of finished asphalt emulsions included within the scope of the present invention. It is to be noted that the percentages for the addition agent are given on the dry basis, i. e. as though the material were added in its pure form and not as a water solution. It is to be understood however that corresponding amounts of the addition agent may be added as a water solution in the manner previously indicated. In the following examples the number appearing immediately following the name of the addition agent indicates the approximate average number of aliphatic substituents per molecule of diphenyl ether.

Example I

| | Per cent |
|---|---|
| "Flintkote" asphalt emulsion | 99.4 |
| Sodium salt of wax-substituted diphenyl ether sulphonic acid disulphide (2.5) | 0.6 |

Example II

| | Per cent |
|---|---|
| "Flintkote" asphalt emulsion | 99.0 |
| Potassium salt of wax-substituted diphenyl ether sulphonic acid disulphide (2.5) | 1.0 |

Example III

| | |
|---|---|
| "Flintkote" asphalt emulsion | 98.2 |
| Sodium salt of wax-substituted diphenyl ether sulphonic acid (2.5) | 1.8 |

Example IV

| | |
|---|---|
| "Flintkote" asphalt emulsion | 99.91 |
| Ammonium salt of wax-substituted diphenyl ether sulphonic acid (1.2) | 0.09 |

Example V

| | |
|---|---|
| Petroleum asphalt emulsion (containing 20% solids) | 99.1 |
| Sodium salt of wax-substituted diphenyl ether sulphonic acid (2.5) | 0.9 |

Example VI

| | |
|---|---|
| Petroleum asphalt emulsion (containing 70% solids) | 98 |
| Lithium salts of wax-substituted diphenyl ether sulphonic acids (mixed 1.2 and 2.5) | 2 |

Example VII

| | |
|---|---|
| "Flintkote" asphalt emulsion | 98.7 |
| Sodium salt of capryl-substituted diphenyl ether sulphonic acid (3.2) | 1.3 |

Example VIII

| | |
|---|---|
| Asphalt emulsion (containing 20% solids) | 98.5 |
| Ammonia salt of wax-substituted diphenyl ether sulphonic acid monosulphide (2.5) | 1.5 |

Example IX

| | |
|---|---|
| Petroleum asphalt emulsion (containing 40% solids) | 99.4 |
| Triethanolamine salt of wax substituted diphenyl ether sulphonic acid tri-sulphide (2.5) | 0.6 |

Example X

| | |
|---|---|
| "Flintkote" asphalt emulsion | 99.1 |
| Sodium salt of wax-substituted diphenyl ether sulphonic acid monosulphide (2.5) | 0.9 |

Example XI

| | |
|---|---|
| "Flintkote" asphalt emulsion | 98.2 |
| Diethanolamine salt of wax-substituted diphenyl ether sulphonic acid (2.5) | 1.8 |

Uses of the Asphalt Emulsions

As previously indicated, there is a wide variety of uses for which the improved asphalt emulsions of the present invention may be employed. It therefore becomes convenient at this point to give in detail a number of illustrative uses of my improved asphalt emulsion.

In the roofing industry today, the conventional practice in using asphalt has been to apply first a layer of hot asphalt to the roof surface. A layer of loosely woven material such as glass fabric, either asphalt impregnated or not, is then placed over this asphalt coated roof, and a second coat of hot asphalt applied over the fabric to impregnate it and provide a final sealing coat. This method is not entirely satisfactory for a number of reasons, the principal ones being the cost of labor involved, difficulty in handling the asphalt, lack of proper penetration of the fabric, tendency to "blister," etc. To overcome these objections, asphalt emulsions as well as asphalt emulsions containing various addition agents have been employed in the same manner as with hot asphalt. The results obtained were unsatisfactory because all of the asphalt emulsions showed very poor wetting properties, and the time required for the asphalt to set was so long that it lacked adhesivity and had poor weathering properties, etc.

I have found, however, that by incorporating the asphalt additives of the present invention in a standard emulsion that most all of the above mentioned difficulties were overcome. The asphalt emulsion is in a very fluid state, has excellent wetting properties, impregnates easily, possesses quick-setting properties and accordingly has high bonding and adhesive properties, and possesses excellent anti-oxidation and weathering properties. The following comparison tests clearly demonstrate the foregoing statements.

Test 1

One ply of glass fabric previously impregnated with a standard hot asphalt was applied to a metal deck by using standard asphalt emulsion.[1] final coat of untreated asphalt emulsion [1] was then applied over the glass fabric. The temperature at the time of application was about 60° C.

Test 2

One ply of glass fabric previously impregnated with a standard hot asphalt was applied to a metal deck by using standard asphalt emulsion [1] containing 2% of sodium petroleum sulphonate. A final coat of treated asphalt emulsion was then applied over the glass fabric. The temperature at the time of application was about 60° C.

Test 3

One ply of glass fabric previously impregnated with a standard untreated hot asphalt was applied to a metal deck by using standard asphalt emulsion [1] containing 1% of sodium salt of wax-substituted diphenyl ether sulphonate disulphide. A final cost of the asphalt emulsion containing the additive was then applied over the glass fabric. The temperature at the time of application was about 55° C.

Test 4

A coat of untreated standard asphalt emulsion [1] was applied on an existing smooth surface asbestos build-up roof which had a very dry surface. A one ply glass fabric which had been previously impregnated with hot asphalt was then placed over the coated roof. A final coat of untreated standard asphalt emulsion [1] was then applied over the glass fabric. Temperature was about 55° C.

Test 5

A coat of standard emulsion [1] containing a 1% to a 15% solution of the sodium salt of wax-substituted diphenyl ether sulphonic acid disulphide was applied on an existing smooth surface asbestos build-up roof which had a very dry surface. A one ply glass fabric which had been previously impregnated with hot asphalt was then placed over the coated roof. A final coat of standard asphalt emulsion containing 1% of a 15% solution of the sodium salt of wax-substituted diphenyl ether sulphonic acid disulphide was then applied over the glass fabric. Temperature was about 55° C.

The above tests were carefully observed and

---

[1] Standard asphalt emulsion containing 50% solids, 46% water, 4% bentonite.

from such observations the following results were obtained and are tabulated in the table below.

variety of compositions including hot asphalt, asphalt emulsion, additive-treated asphalt emul- Table A

| Test No. | Wetting Characteristics | Penetrability of Fabric | Setting Time | Bonding Characteristics | Fluidity of Emulsion | Plasticity of Set Emulsion | Addition Agent |
|---|---|---|---|---|---|---|---|
| 1 | Does not wet fabric. | Does not penetrate. | 8 hrs. | Does not bond with metal. | Static. | Poor. | None. |
| 2 | Good. | Poor. | Sets in 2 hrs. but "skins" and will blister. | do | Flowable but not fluid. | Fair. | Sodium petroleum sulphonate. |
| 3 | Excellent. | Excellent. | Sets completely in 2 hrs. with no trapped water. | Bonds completely with all contours of metal. | Very fluid. | Excellent. | Sodium salt of disulphide of wax-diphenyl ether sulphonic acid-(2.5). |
| 4 | Does not wet fabric. | Does not penetrate. | 6 hrs. | Does not bond with roofing asbestos. | Static. | Poor. | None. |
| 5 | Excellent. | Excellent. | Sets completely in 2 hrs. with no trapped water. | Bonds completely with all contours of roofing. | Very fluid. | Excellent. | As in 3. |

The final test of any roofing composition is its ability to stand up under all types of weathering conditions. It therefore becomes convenient at this point to give comparative weathering data obtained from weathering tests conducted on a number of asphalt emulsions containing different asphalt addition agents.

The following asphalt emulsions were prepared and each was then applied to a clean aluminum strip to form a 0.015" film on the strips. The strips were cured for 48 hours at room temperature and then placed in a standard Atlas weatherometer for a period of 500 hours. For a full description of the procedure employed in conducting these tests in the Atlas weatherometer, reference may be had to the catalog entitled "Atlas Weatherometers" published by Atlas Electric Devices Co., Chicago 10, Illinois. The results of the above tests are tabulated in the following table.

sions, etc., have been employed for this purpose without success. In each instance asphalt materials were highly viscous and did not wet or penetrate the cloth properly. On the contrary, the composition coated only the outer surface of the thread and did not penetrate within to coat the individual strands that go to make up the thread. In order to have a satisfactory weave set, such penetration must take place. Furthermore, in each instance, the asphalt compositions bridged and clogged the mesh of the cloth thereby rendering the cloth almost completely non-porous. For ordinary uses the cloth was unsuited.

I have found, however, that a standard asphalt emulsion containing my addition agents within the range previously given and particularly when using 1 to 4% by weight of a 15% water solution of the additive may be employed with good results. When using my improved fluid asphalt Table B

| Sample No. | Composition [1] | Fluidity Rating of Composition | Appearance | | | Rating at 500 Hours | | |
|---|---|---|---|---|---|---|---|---|
| | | | 300 hours | 400 hours | 500 hours | Surface Oxidation | Plasticity | Overall |
| 1 | Standard emulsion 10% water.[2] | 6—Static does not flow. | Fair—few small pits and hard spots, surface oxidation sl. | Failed—Cracked through to metal. | Failed. | 2 | 5 | 5 |
| 2 | Standard emulsion 5% water.[2] | 7—Static does not flow. | Fair—few small pits and hard spots, surface oxidation sl. | do | do | 6 | 6 | 6 |
| 3 | Standard emulsion 0.83% sodium petroleum sulphonate, 2.5% water.[2] | 5—Slightly flowable, not fluid. | Failed—weathered through to metal in spots. | Failed—Surface oxidation present. | do | 7 | 7 | 7 |
| 4 | Standard emulsion 1.0% sodium salt of wax-substituted diphenyl ether sulphonic acid disulphide, 6% water.[2] | 2—Very fluid. | Good—small pits, very slight surface oxidation. | Fair—Pits somewhat deeper, surface oxidation more pronounced. | Fair—Ridging pronounced. | 4 | 4 | 3 |
| 5 | Standard emulsion 0.5% sodium salt of wax-substituted diphenyl ether sulphonic acid disulphide, 3% water.[2] | 4—Very fluid. | Excellent—very little pitting, very slight surface oxidation. | Excellent—little pitting, slight surface oxidation. | Good—surface intact, but hard sub-surface plastic; some thin spots. | 3 | 2 | 2 |
| 6 | Standard emulsion 1.0% sodium salt of wax-substituted diphenyl ether sulphonic acid, 5.0% water.[2] | 1—Very fluid. | Good—small pits, very slight surface oxidation. | Fair—Pits somewhat deeper, surface oxidation more pronounced. | Fair—Ridging pronounced. | 5 | 3 | 4 |
| 7 | Standard emulsion 0.5% sodium salt of wax-substituted diphenyl ether sulphonic acid, 3.5% water.[2] | 3—Very fluid. | Excellent—no pitting, very slight surface oxidation. | Excellent—very slight pitting; slight surface oxidation. | Good—surface intact but hard, sub-surface plastic. | 1 | 1 | 1 |

[1] Additive %'s are on dry weight basis.
[2] Standard emulsion containing 50% solids, 4% bentonite.

Another use for which the improved asphalt emulsions of the present invention have been found adaptable is as a weave set for cloth such as loosely-woven glass cloth. In the past a wide emulsion as a weave set, the cloth is thoroughly wetted and each strand going to make up the threads of the cloth is substantially coated with a film of asphalt thereby securing the strands in the thread to each other. Moreover there was no bridging or clogging of the mesh.

It should be noted when employing my improved asphalt emulsion as a weave set, the finished product is somewhat tacky and for certain uses this tackiness may be objectionable. To obviate this difficulty, it has been found that a paste composed of gilsonite, blood albumen and water such that there is 10–20% of the gilsonite suspended in the composition may be employed to overcome the slight tackiness.

A process which may be employed in removing this tackiness is as follows: A glass fabric (24 x 24 mesh) is passed into a trough containing an additive-treated emulsion having a composition corresponding to that used in test 3 above where it is submerged by means of a roller. On emergence from the coating bath, the fabric passes between squeeze rollers to express the excess emulsion. Doctor knives on the squeeze rolls prevent build-up of hardened emulsion. The coated fabric then passes through an infra-red oven with forced air circulation maintained at about 370° F. where the emulsion is set and the majority of water expelled. At the very end of the oven the coated fabric is passed into a second trough similar to the first, but containing the gilsonite suspension, as described above, agitated by compressed air. On emergence from the rolls of the gilsonite bath, the fabric makes a second pass through an infra-red oven where the water is evaporated and the gilsonite fused on the surface. The coated fabric is then rolled for storage and shipment.

Another use for which my improved emulsions may be employed is as a bonding and coating material for glass mats or felts. At the present time this is being accomplished by the use of a synthetic resin such as furfuryl-phenol. Such products possess numerous deficiencies, the principal ones being that the mat or felt lacks tensile strength and is not readily wet by asphalt. Hot asphalt has been employed also as a bonding material, but the resultant product was not properly bonded and was completely non-porous.

It has been found that the asphalt emulsions containing my addition agents overcome all these prior difficulties. The glass mats or felts treated with my improved asphalt emulsion are wetted exceptionally well and possess high tensile strength. The finished products were thoroughly bonded and fully porous.

One method which may be employed on glass felt is to add from 2 to 4% of my addition agents to a standard asphalt emulsion and dilute it with water to a 10–20% solid concentration. This emulsion is then sprayed on one side of a furfuryl-resin-bonded felt. It should be noted that it is necessary to spray but one side of the felt since the additive-treated emulsions penetrate the material so that the fibers are well coated. The finished products are more flexible and possess a higher tensile strength than the treated felts previously produced.

A preferred method, omitting the furfuryl-resin treatment, of producing glass mats and felts is to spin the glass strands from a spinneret on to a moving conveyor belt. The speed at which the conveyor belt moves determines the thickness of the mat or felt. In my coating and bonding process, the strands are sprayed as they emerge from the spinneret and before they fall on to the conveyor with an asphalt emulsion to which has been added from 2–4% of my addition agent, and which has been thinned with water to 10–20% solids. The coated strands then fall on to the conveyor belt and are bonded to one another to form the mat. The finished product wets exceptionally well, is quite plastic, possesses very high tensile strength, and is porous.

Another use in which my improved asphalt emulsion has been put is in the production of asphalt paper. This product is made in the ordinary manner from a paper fiber pulp admixed with asphalt. The major difficulty with the prior products is low tensile strength. I have found that my improved asphalt emulsions when incorporated with such paper fibers will produce a superior and improved asphalt paper having a very high tensile strength.

There are many other uses in which my improved asphalt emulsions may be employed, the previously mentioned uses being indicative of but a few. Other illustrative uses are in asphalt road compositions containing mineral aggregate wherein the high fluidity, quick-setting, wetting and high bonding properties of my improved emulsion will be found to be of particular advantage. In the under coating of roofing shingles where high stability, good bonding, and quick-setting properties are required, my improved asphalt emulsion will be found particularly useful. Likewise, my improved asphalt emulsion is of utility as a bonding agent or backing for various types of films.

Other modes of applying the principle of the invention may be employed, change being made as regards the details described, provided the features stated in any of the following claims, or the equivalent of such, be employed.

I therefore particularly point out and distinctly claim as my invention:

1. An asphaltic composition comprising a major amount of an asphalt-in-water emulsion and from about .05% to about 2% of a compound having the formula:

$$RSO_3X$$

wherein R is an aliphatic-substituted diphenyl-ether group containing at least 20 aliphatic carbon atoms and X is one equivalent of a hydrophilic salt-forming radicle selected from the class consisting of the alkali metals, ammonium, and organic substituted ammonium.

2. An asphaltic composition comprising a major amount of an asphalt-in-water emulsion and from about .05% to about 2% of a compound having the formula:

$$RSO_3X$$

wherein R is an aliphatic-substituted diphenyl-ether group, having at least one aliphatic group of at least 20 carbon atoms, and X is one equivalent of a hydrophilic salt-forming radicle selected from the class consisting of the alkali metals; ammonium, and organic substituted ammonium.

3. An asphaltic composition comprising a major amount of an asphalt-in-water emulsion and from about .05% to about 2% of a compound having the formula:

$$XO_3S-R-S_n-R'-SO_3X$$

wherein R and R' are each an aliphatic-substituted diphenyl-ether group containing at least 20 aliphatic carbon atoms, X is a hydrophilic salt-forming radicle selected from the class consisting of the alkali metals, ammonium, and organic substituted ammonium, and $n$ is a small whole number no more than 6.

4. A composition in accordance with claim 3 in which the —S$_n$— group is directly attached to ring carbon atoms of 2 diphenyl ether groups.

5. An asphaltic composition comprising a major amount of an asphalt-in-water emulsion and from about .5% to about 10% of a water solution containing about 15% of a compound having the formula:

$$RSO_3X$$

wherein R is an aliphatic-substituted diphenyl-ether group containing at least 20 aliphatic carbon atoms, and X is one equivalent of a salt-forming radicle selected from the class consisting of the alkali metals, ammonium and organic substituted ammonium.

6. An asphaltic composition comprising a major amount of an asphalt-in-water emulsion and from about .5% to about 10% of a water solution containing about 15% of a compound having the formula:

$$XO_3S—R—S_nR'—SO_3X$$

wherein R and R' are each one alkylated diphenyl-ether group containing at least 20 aliphatic carbon atoms, X is a hydrophilic salt-forming radicle selected from the class consisting of the alkali metals, ammonium, and organic substituted ammonium, and $n$ is a small whole number no more than 6.

7. An asphaltic composition comprising a major amount of an asphalt-in-water emulsion and from about .05% to about 2% of a hydrophilic salt of an aliphatic-substituted diphenyl-ether sulphonic acid containing at least 1 aliphatic substituent imparting at least 20 carbon atoms to the diphenyl ether group, the salt-forming radicle of said hydrophilic salt being selected from the class consisting of the alkali metals, ammonium, and organic substituted ammonium.

8. An asphaltic composition comprising a major amount of an asphalt-in-water emulsion and from about .05% to about 2% of a hydrophilic salt of a hydrocarbon wax-substituted diphenyl-ether sulphonic acid, the salt-forming radicle of said hydrophilic salt being selected from the class consisting of the alkali metals, ammonium, and organic substituted ammonium.

9. An asphaltic composition comprising a major amount of an asphalt-in-water emulsion and from about .05% to about 2% of a hydrophilic salt of an aliphatic-substituted diphenyl-ether sulphonic acid containing at least 20 aliphatic carbon atoms per diphenyl-ether group, the salt-forming radicle of said hydrophilic salt being selected from the class consisting of the alkali metals, ammonium, and organic substituted ammonium.

10. An asphaltic composition comprising a major amount of an asphalt-in-water emulsion and from about .05% to about 2% of an alkali metal salt of a hydrocarbon wax-substituted diphenyl-ether sulphonic acid.

11. A composition in accordance with claim 10 in which the alkali metal salt is the sodium salt.

12. An asphaltic composition comprising a major amount of an asphalt-in-water emulsion and from about .05% to about 2% of the sodium salt of a hydrocarbon wax-substituted diphenyl-ether sulphonic acid, there being on the average of about 2.5 wax groups per diphenyl ether group.

13. An asphaltic composition comprising a major amount of an asphalt-in-water emulsion and from about .05% to about 2% of a hydrophilic sulphonate of an aliphatic-substituted diphenyl-ether sulphide, said aliphatic substituent imparting at least 20 carbon atoms per diphenyl-ether group and the salt-forming radicle of said hydrophilic salt being selected from the class consisting of the alkali metals, ammonium and organic substituted ammonium.

14. An asphaltic composition comprising a major amount of an asphalt-in-water emulsion and from about .05% to about 2% of a hydrophilic sulphonate of a hydrocarbon wax-substituted diphenyl-ether sulphide, the salt-forming radicle of said sulphonate being selected from the class consisting of the alkali metals, ammonium, and organic substituted ammonium.

15. An asphaltic composition comprising a major amount of an asphalt-in-water emulsion and from about .05% to about 2% of a hydrophilic sulphonate of an aliphatic-substituted diphenyl ether polysulphide containing at least 20 aliphatic carbon atoms per diphenyl-ether group, the salt-forming radicle of said sulphonate being selected from the class consisting of the alkali metals, ammonium and organic substituted ammonium.

16. An asphaltic composition comprising a major amount of an asphalt-in-water emulsion and from about .05% to about 2% of a hydrophilic sulphonate of a hydrocarbon wax-substituted diphenyl-ether disulphide, the salt-forming radicle of said sulphonate being selected from the class consisting of the alkali metals, ammonium and organic substituted ammonium.

17. An asphaltic composition comprising a major amount of an asphalt-in-water emulsion and from about .05% to about 2% of an alkali metal sulphonate of a hydrocarbon wax-substituted diphenyl-ether sulphide.

18. An asphaltic composition comprising a major amount of an asphalt-in-water emulsion and from about .05% to about 2% of the sodium sulphonate of a hydrocarbon wax-substituted diphenyl-ether sulphide.

19. An asphaltic composition comprising a major amount of an asphalt-in-water emulsion and from about .05% to about 2% of an alkali metal sulphonate of a hydrocarbon wax-substituted diphenyl-ether polysulphide.

20. An asphaltic composition comprising a major amount of an asphalt-in-water emulsion and from about .05% to about 2% of an alkali metal sulphonate of a hydrocarbon wax-substituted diphenyl-ether disulphide.

21. An asphaltic composition comprising a major amount of an asphalt-in-water emulsion and from about .05% to about 2% of the sodium sulphonate of a hydrocarbon wax substituted diphenyl-ether polysulphide.

22. An asphaltic composition comprising a major amount of an asphalt-in-water emulsion and from about .05% to about 2% of the sodium sulphonate of a hydrocarbon wax-substituted diphenyl-ether disulphide.

23. An asphaltic composition comprising about equal parts of asphalt and water, about 4% of bentonite, and from about .05% to about 2% of a hydrophilic salt of an aliphatic-substituted diphenyl-ether sulphonic acid containing at least 20 aliphatic carbon atoms and in which the salt-forming radicle is selected from the class consisting of the alkali metals, ammonium, and organic substituted ammonium.

24. An asphaltic composition comprising about equal amounts of asphalt and water, about 4% bentonite; and from about .05% to about 2% of the sodium sulphonate of hydrocarbon wax-substituted diphenyl-ether.

25. An asphaltic composition comprising about equal parts of asphalt and water, about 4% of bentonite; and from about .05% to about 2% of the sodium sulphonate of hydrocarbon wax-substituted diphenyl-ether disulphide.

26. A porous, fibrous glass body, the fibers of which are bonded by asphalt derived from an asphalt emulsion composition in accordance with claim 1.

27. A porous fibrous glass body, the fibers of which are bonded by asphalt derived from an asphalt emulsion composition in accordance with claim 3.

WILLIS G. CRAIG.

REFERENCES CITED

The following references are of record in the file of this patent:

UNITED STATES PATENTS

| Number | Name | Date |
|---|---|---|
| 2,081,876 | Prahl | May 25, 1937 |
| 2,197,835 | Reiff | Apr. 23, 1940 |